(12) United States Patent
Martin et al.

(10) Patent No.: US 7,710,079 B2
(45) Date of Patent: May 4, 2010

(54) POWER MANAGER AND POWER MANAGING METHOD FOR BATTERY-POWERED APPLICATION

(75) Inventors: Steven L. Martin, Chelmsford, MA (US); Trevor W. Barcelo, Andover, MA (US); Samuel H. Nork, Andover, MA (US); Roger A. Zemke, Londonderry, NH (US); David J. Simmons, Northborough, MA (US)

(73) Assignee: Linear Technology Corporation, Milpitas, CA (US)

( * ) Notice: Subject to any disclaimer, the term of this patent is extended or adjusted under 35 U.S.C. 154(b) by 866 days.

(21) Appl. No.: 11/183,960

(22) Filed: Jul. 19, 2005

(65) Prior Publication Data

US 2007/0029975 A1 Feb. 8, 2007

(51) Int. Cl.
- *H02J 7/06* (2006.01)
- *H02J 7/04* (2006.01)
- *H02M 3/335* (2006.01)
- *G05F 1/00* (2006.01)

(52) U.S. Cl. .................. 320/164; 320/145; 320/157; 320/158; 320/159; 363/80; 323/271

(58) Field of Classification Search ........ 320/162–164, 320/141, 145, 152, 157–159; 323/271; 363/80
See application file for complete search history.

(56) References Cited

U.S. PATENT DOCUMENTS

| 5,402,055 | A | 3/1995 | Nguyen |
| 5,625,275 | A | 4/1997 | Tanikawa et al. |
| 5,723,970 | A | 3/1998 | Bell |
| 5,994,876 | A | 11/1999 | Canny et al. |
| 6,157,173 | A | 12/2000 | Baranowski et al. |
| 6,184,660 | B1 * | 2/2001 | Hatular .................. 320/141 |
| 6,300,744 | B1 | 10/2001 | Shum |
| 6,388,426 | B1 * | 5/2002 | Yokoo et al. ............ 320/136 |
| 6,404,251 | B1 | 6/2002 | Dwelley et al. |
| 6,507,172 | B2 | 1/2003 | Sherman |
| 6,522,118 | B1 | 2/2003 | Barcelo et al. |
| 6,583,603 | B1 | 6/2003 | Baldwin |
| 6,861,824 | B1 | 3/2005 | Liu et al. |
| 7,064,521 | B2 * | 6/2006 | Stanesti et al. .......... 320/126 |
| 7,348,760 | B2 * | 3/2008 | Bucur et al. ............ 320/132 |
| 2005/0242786 | A1 | 11/2005 | Sawyers et al. |
| 2005/0253560 | A1 | 11/2005 | Popescu-Stanesti et al. |
| 2007/0103118 | A1 | 5/2007 | Takagi et al. |

OTHER PUBLICATIONS

"Dual 2.6A, 2.5V to 5.5V, Ideal Diodes in 3mm ×3mm DFN", Linear Technology, LTC4413, pp. 1-12.

* cited by examiner

*Primary Examiner*—Patrick J Assouad
*Assistant Examiner*—Richard V Muralidar
(74) *Attorney, Agent, or Firm*—McDermott Will & Emery LLP (57) ABSTRACT

A power manager is configured to manage power for a battery-powered application. A power source, a load and a battery are interconnected through a circuit path. Power from the power source is provided to the load and battery by a switching regulator. Various implementations are presented.

11 Claims, 4 Drawing Sheets

POWER MANAGER AND POWER MANAGING METHOD FOR BATTERY-POWERED APPLICATION

TECHNICAL FIELD

This disclosure is related generally to a power manager and power managing method for a battery-powered application. Specifically, the disclosure relates to a power manager and method controlling power delivery to a load and a battery from a power source.

Description of Related Art

Rechargeable batteries are commonly used to power portable electronic devices, such as laptop computers, PDAs, digital cameras and MP3 players. Many of those portable electronic devices include circuitry for charging the batteries of the devices whenever the devices are connected to external power sources such as a wall adapter, USB, Firewire, and Ethernet. For example, the USB itself can be used to directly power the devices and charge the batteries. According to USB specifications, USB hosts or USB powered hubs are only allowed to provide as much as 500 mA from their nominal 5V supply. Therefore, the current drawn from the USB must be limited (regulated) by the portable electronic devices.

Figure 1:
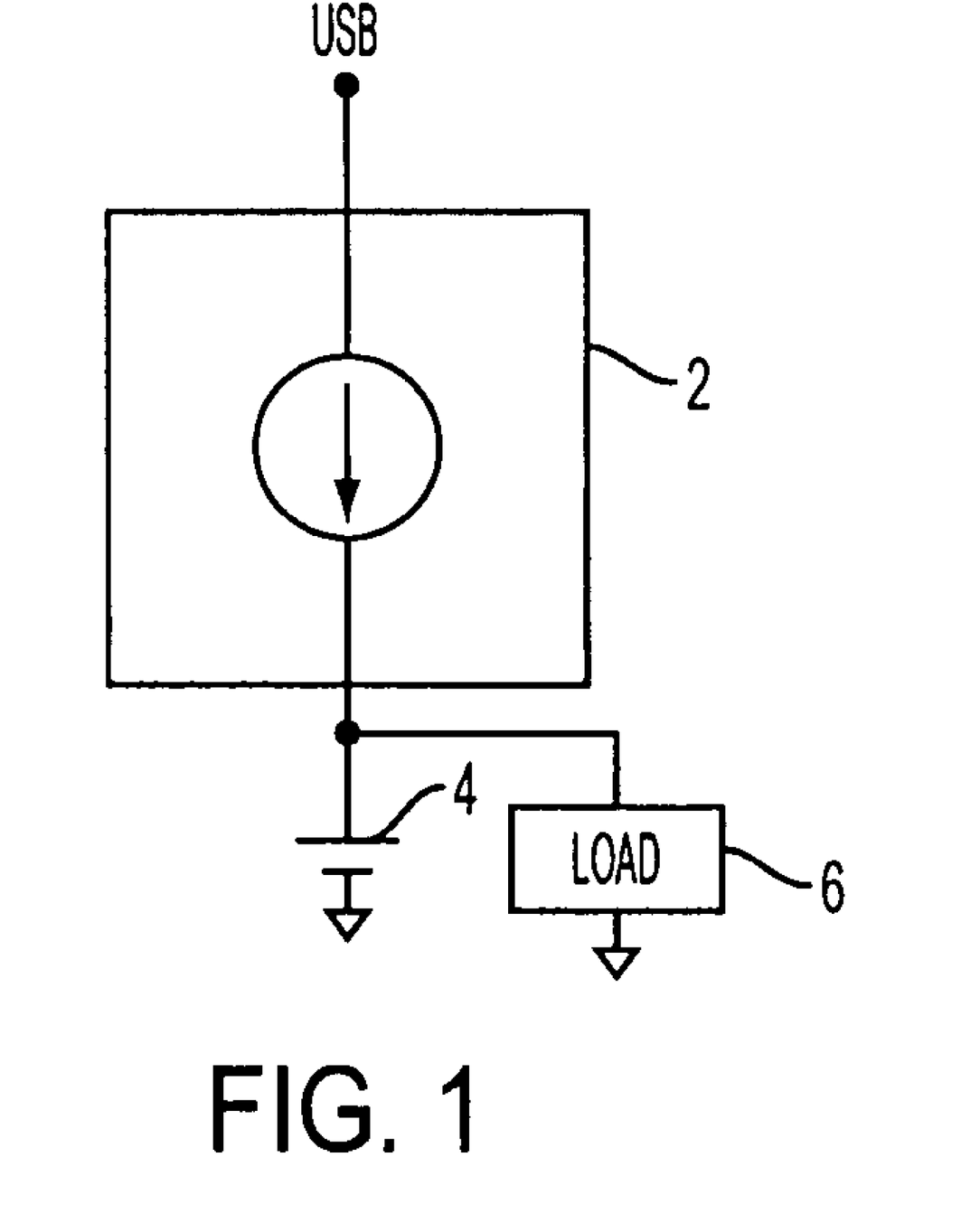
FIG. 1 is an example of a schematic circuit topology for providing power to a load and charging a battery, incorporated into a portable USB device.

FIG. 1 shows an example of a schematic circuit topology for providing power to a load and charging a battery incorporated in a portable USB device. As shown in FIG. 1, a USB linear charger 2 generally provides current limited power directly to a battery 4 to which a system load 6 is tied in parallel with battery 4. This topology maintains the USB current constraint but sacrifices efficiency in that there may be a substantial voltage drop from USB input voltage to battery voltage. The voltage applied to system load 6 is the battery voltage, and the current drawn by system load 6 is equal to the power requirement of load 6 divided by the battery voltage. With load 6 tied directly to battery 4, if the battery voltage is very low or battery 4 is dead, there will not be enough voltage to be applied to load 6 to run an application. This is true even if there is external power applied to load 6 and battery 4 because the battery dictates the voltage to be applied to load 6. When battery 4 is fully discharged, several minutes of charging may be required before any load can be connected to the battery. Moreover, many battery or handheld applications have a peak current that can exceed the 500 mA USB specification. Input current from the limited current source to USB linear charger 2 needs to be controlled properly when peak current of load 6 exceeds the USB specification. The subject matter described herein addresses, but is not limited to, the above shortcomings.

SUMMARY OF DISCLOSURE

Embodiments detailed herein describe a power manager and power managing method for a battery-powered application. In one aspect, a power source, a load and a battery may be interconnected through a circuit path to provide power to the load and battery from the power source. A switching regulator may be provided to deliver power from the power source to the load and battery through the circuit path.

The battery may be coupled to the circuit path through a first circuit for charging the battery. A voltage across the first circuit is preferably monitored by a second circuit, and in response the switching regulator is controlled to limit the voltage within a voltage limit. The voltage limit preferably varies depending on battery charge current.

Current in the circuit path may be monitored by a third circuit, and in response, the switching regulator controlled to limit the current within a current limit. The third circuit is preferably configured to obtain an averaged current in the circuit path so as to compare the averaged current with the current limit. The current in the circuit path may be limited when it exceeds the current limit, causing a voltage in the circuit path to drop. When the voltage in the circuit path drops to just above the level of the battery voltage, the first circuit enters dropout from the circuit path. That is, the first circuit may be unable to deliver its entire programmed charge current to the battery. In this case, since the first circuit is unable to regulate charge current it becomes a resistive element seeking its lowest possible resistance. Due to the nature of a resistive element, the charge current into the battery is automatically reduced to only the amount that can be supported given the current limited switching regulator and the external load. Likewise, when the voltage in the circuit path falls below battery voltage, current from the battery can be provided to the load through the first circuit. The first circuit may include, or be configured to operate as, a diode to provide the current from the battery to the load. An auxiliary diode or ideal diode with a separate conduction path may also be included to deliver current from $V_{BAT}$ to $V_{OUT}$.

In another aspect, a power source and a load may be interconnected through a circuit path to provide power from the power source to the load, and a battery may be coupled to the circuit path by a first circuit to charge the battery. An output voltage in the circuit path may be monitored, and in response, controlled to be maintained within the level of the battery voltage plus an offset voltage. The offset voltage may vary depending on battery current. The output voltage may be compared with a reference voltage when the battery voltage is lower than the reference voltage, and in response, the output voltage controlled to be maintained within the level of the reference voltage. Current in the circuit path may also be monitored, and in response, controlled to be maintained within a current limit. The circuit path current is limited when it exceeds the current limit, causing a voltage in the circuit path to drop. When the voltage in the circuit path falls to just above the level of the battery voltage, the first circuit enters dropout. That is, the first circuit may be unable to deliver its entire programmed charge current to the battery and the first circuit is reduced to a simple resistive element seeking its lowest possible resistance. When the first circuit is reduced to a resistive element, power available from the circuit path preferentially flows to the load first and only remaining power charges the battery. This prioritization of available power to the load occurs automatically due to the topology.

In still another aspect, a power source and a load may be interconnected through a circuit path, and a battery preferably coupled to the circuit path by a first circuit for charging the battery. Power delivery through the circuit path to the load and battery is controlled by monitoring a voltage across the first circuit to detect whether the voltage exceeds a voltage limit, and monitoring current in the circuit path to detect whether the current exceeds a current limit. Power delivery is limited in response thereto.

Additional aspects and advantages of the present disclosure will become readily apparent to those skilled in the art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Examples of the subject matter claimed herein are illustrated in the figures of the accompanying drawings and in which reference numerals refer to similar elements and in which:

DESCRIPTION OF THE EMBODIMENT

Figure 2:
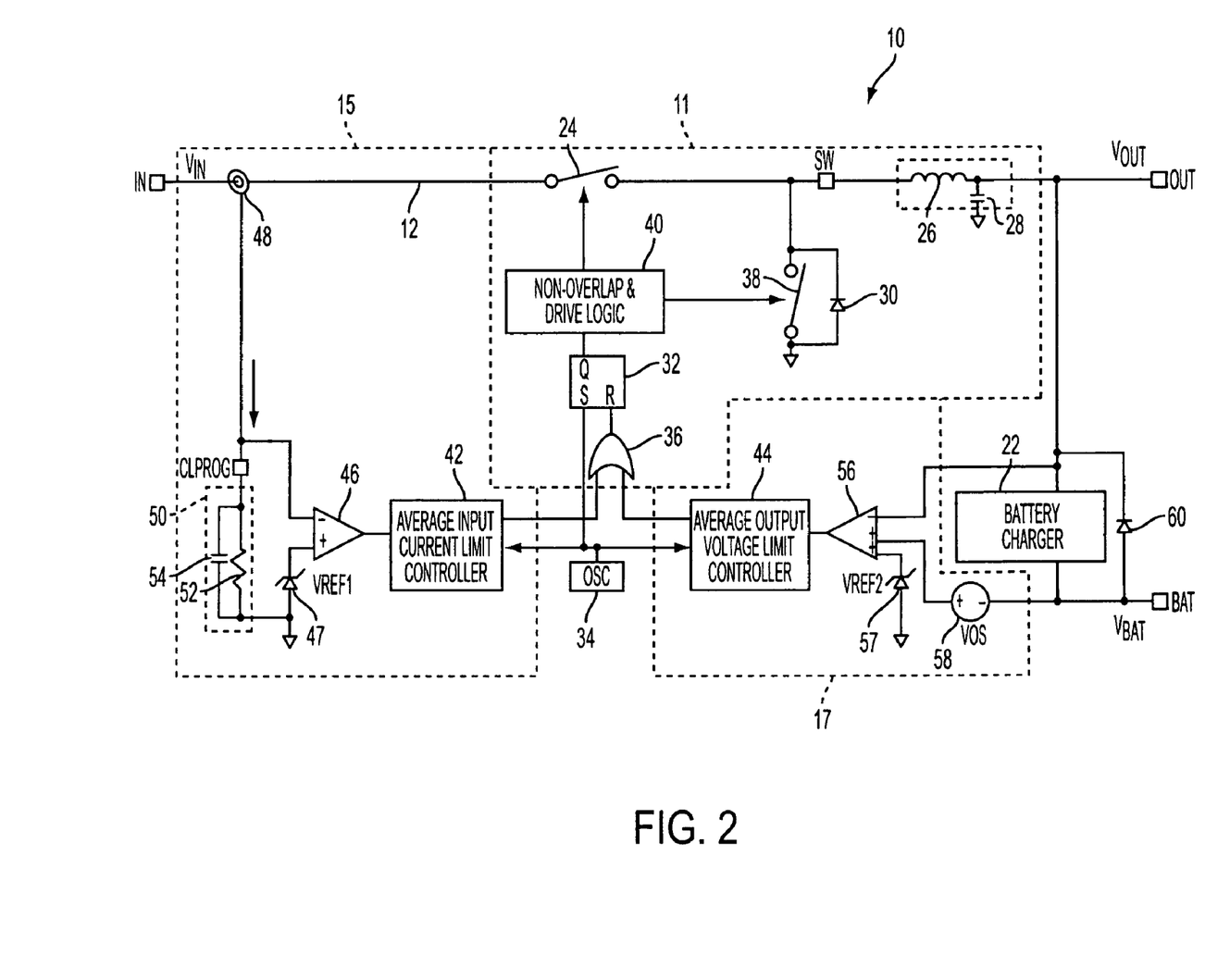
FIG. 2 is an exemplary configuration of a power manager according to one embodiment of the disclosure.

FIG. 2 illustrates one embodiment of a power manager for battery-powered applications. The power manager explained herein can provide efficient use of available input power under all load and battery conditions, and reduction in power dissipation of a battery charger. Power manger 10 may be, but is not necessarily, formed on a single chip.

A power manager 10 in FIG. 2 may include a circuit path 12 having an IN pin and an OUT pin. A wall adaptor or a source whose current is to be constrained such as a USB may be connected to the IN pin, and a load is tied to the OUT pin. A BAT pin, to which a battery is connected, is coupled to circuit path 12 through a battery charger 22. In this topology, the load is directly tied to circuit path 12, whereas the battery is not directly tied to the path.

Power manager 10 may be configured to drive the load from an available source of power, and simultaneously charge the battery with any available leftover current from the source. When the USB (or wall adaptor) is present, power manager 10 connects USB power directly to the load through circuit path 12. For example, USB hosts or USB powered hubs provide as much as 500 mA from their nominal 5V supply. Because the battery is not in circuit path 12 whereas the load is tied directly to the USB or wall adaptor, the load can be powered even if the battery is low or dead.

The embodiment shown in FIG. 2 may employ a high efficiency synchronous switching regulator 11 to convert the wall adapter or USB input to an output voltage $V_{OUT}$, and simultaneously power the load and battery charger 22. The switching regulator employed may be a buck regulator, for example. The embodiment includes a power switch 24, disposed between the IN pin and a SW pin of circuit path 12. Power switch 24 alternately connects and disconnects an input voltage $V_{IN}$ to an inductor 26. When the switch turns on, input voltage $V_{IN}$ is connected to inductor 26. The difference between the input and output voltages is then forced across inductor 26, causing current through the inductor ("inductor current") to increase. During the ON time of power switch 24, the inductor current flows into the load as well as battery charger 22 (if enough current is available). An output capacitor 28 is charged during this time. When power switch 24 is turned off, input voltage $V_{IN}$ applied to inductor 26 is removed. However, since the inductor current cannot change instantaneously, the voltage across inductor 26 will adjust to hold the inductor current constant. The input end of inductor 26 (SW pin) is forced negative in voltage by the decreasing current, eventually reaching the point where diode 30, coupled between circuit path 12 and ground, is turned on. The inductor current then flows through the load and battery charger and back through diode 30. Inductor 26 and capacitor 28 can externally be provided to the SW pin in this example.

Turning on and off power switch 24 to establish a prescribed duty cycle may be controlled by changing the on time of a pulse waveform, in this example, which is known as pulse width modulation ("PWM"). The duty cycle is the percentage of time that power switch 24 is ON relative to the total period of the switching cycle. By controlling the duty cycle of power switch 24, output voltage $V_{OUT}$ can be regulated. The on-time in this regard may be controlled by RS flip-flop 32, which receives a set signal from an oscillator 34, and a reset signal from an OR gate 36. RS flip-flop 32 thus terminates the switching pulse during a regulator switching cycle to establish a regulator duty cycle based on the reset signal from OR gate 36.

In the topology shown in FIG. 2, a synchronous switch 38 is connected between circuit path 12 and ground in parallel with diode 30. Synchronous switch 38 is optional, but if this switch is present, power dissipation at diode 30 will improve. If synchronous switch 38 has a resistance lower than that of diode 30, the voltage across synchronous switch 38 will be less than the voltage across diode 30, thereby reducing dissipated power and increasing efficiency. Synchronous switch 38 and power switch 24 are controlled by a non-overlap and drive logic 40 configured to ensure that one switch is turned off before the other is turned on.

As mentioned above, the reset signal is input from OR gate 36 to reset input R of RS flip-flop 32. One input of the OR gate may be from average input current limit control loop 15, and another input from average output voltage limit control loop 17. Either of the outputs of those loops terminates the switching pulse during a regulator switching cycle to establish a regulator duty cycle. The reset signals from the two loops are generated in synchronization with oscillator 34. Each of these control loops 15, 17 may independently control the regulator duty cycle, as will be described later.

Battery charger 22 may be a constant-current/constant-voltage battery charger, implementation of which is disclosed, for example, in U.S. Pat. No. 6,522,118 to Barcelo et al., which is hereby incorporated by reference. Battery charger 22 may provide current to the battery using a fixed current until the battery is nearly charged. When the battery is nearly charged, the charger preferably provides a variable current to the battery in order to maintain the voltage level across the battery.

Average input current limit control loop 15 may be configured to monitor current flowing in circuit path 12, in particular, average current flowing through power switch 24 ("switch current"), in this example. If the average switch current exceeds the current limit, the loop generates the reset signal to limit the switch current within the current limit. Specifically, the loop is intended to prevent switching regulator 11 from drawing more than a programmed amount of average input current, e.g., 500 mA, which is required by the USB specification, for example.

A current sensing element 48 may be configured to generate a scaled-down replica of the switch current. Connected to pin CLPROG is an RC network 50 which can externally be provided to power manager 10. A resistor 52 sets the current limit and a capacitor 54 averages current flowing in resistor 52 to obtain an averaged replica of the switch current. A voltage generated at the CLPROG pin is applied to the inverting input of an error amplifier 46, and a reference voltage $V_{REF1}$ is also applied to the non-inverting input of the amplifier by a zener diode 47. Amplifier 46 compares these voltages, and generates an error signal depending on the difference between these voltages. The error signal produced by amplifier 46 is provided to average input current limit controller 42, from which the reset signal is generated. The reset signal is provided to OR gate 36, terminating the switching pulse during a regulator switching cycle.

Average output voltage limit control loop 17 may be configured to monitor voltage across battery charger 22 and generate the reset signal to limit the voltage to be maintained within a voltage limit. In other words, this loop maintains the average output voltage $V_{OUT}$ to the level of the programmed voltage limit plus battery voltage $V_{BAT}$. Since the voltage across battery charger 22 is thereby maintained low if the voltage limit is set to a low value, the power dissipation of the charger can be minimized.

An error amplifier 56 monitors the voltage across battery charger 22. The OUT pin is coupled to the inverting input of the amplifier and the BAT pin is coupled to the non-inverting input. A voltage source 58 between the non-inverting input and the BAT pin provides offset voltage VOS. When these amplifier 56 inputs are balanced, the voltage difference across battery charger 22 is maintained at the level of the offset voltage VOS. For example, offset voltage VOS may be 300 mV, but can adaptively be set as a function of battery charger current to further minimize power dissipation in battery charger 22.

Average output voltage limit controller 44 receives an error signal from amplifier 56, and generates the reset signal when the voltage across battery charger 22 exceeds offset voltage VOS. In other words, this control loop forces output voltage $V_{OUT}$ to be within the level of battery voltage $V_{BAT}$ plus the offset voltage VOS. The offset voltage may be large enough to keep battery charger 22 from entering dropout (as discussed below).

Amplifier 56 has another non-inverting input for receiving a reference voltage $V_{REF2}$ provided by zener diode 57. This reference voltage $V_{REF2}$ maintains control of the output voltage at $V_{OUT}$ when battery voltage $V_{BAT}$ drops below the reference. For example, in the event of a severely discharged battery, output voltage $V_{OUT}$ may be maintained within the level of the reference voltage $V_{REF2}$. An exemplary reference voltage $V_{REF2}$ is 3.6V in this embodiment.

As described below, battery charger 22 may be configured to become unable to deliver programmed current to the battery when output voltage $V_{OUT}$ falls near battery voltage $V_{BAT}$. That is, battery charger 22 will be unable to regulate its programmed charge current and will therefore become a resistive element seeking to reach its lowest possible resistance. In this situation, battery charger 22 may then conduct current from the BAT pin to the OUT pin, thereby preventing output voltage $V_{OUT}$ from falling much below battery voltage $V_{BAT}$ (see FIG. 3). A comparator (see also FIG. 3) may be included in battery charger 22 to compare the voltage from $V_{BAT}$ to $V_{OUT}$, and in the presence of a given positive voltage threshold force battery charger 22 to its lowest resistance state thereby in effect configuring battery charger 22 as an ideal diode especially under transient conditions.

An auxiliary diode (or ideal diode circuit) 60 may additionally be coupled between the OUT pin and the BAT pin. Implementation of such an auxiliary ideal diode circuit is well known, e.g., see commercially available LTC 4413 dual ideal diode integrated circuit, manufactured by Linear Technology Corporation, and described in its corresponding datasheet, incorporated herein by reference. Alternatively, only diode 60 may be provided to conduct current from the BAT pin to the OUT pin in order to prevent output voltage $V_{OUT}$ from falling much below battery voltage $V_{BAT}$.

In operation, power manager 10 first may increase power from the IN pin to the OUT pin via the SW pin until at least one of loops 15, 17 enters regulation. In this case, power switch 24 may be controlled by switching pulses with 100% duty cycle. Average input current limit control loop 15 monitors the average switching current to determine if the average current exceeds the current limit set by RC network 50 and voltage reference $V_{REF1}$. Average output voltage limit control loop 17 also monitors the average voltage across battery charger 22 to determine if the average voltage exceeds the voltage limit, i.e., offset voltage VOS. In the case where the battery is fully discharged, average output voltage limit control loop 17 compares output voltage $V_{OUT}$ and reference voltage $V_{REF2}$, and determines if the voltage exceeds the reference voltage. Based on either of the loops 15 and 17, the reset signal is applied to RS flip-flop 32, and the duty cycle of the switching pulses applied to power switch 24 is controlled in this manner.

When the average current exceeds the current limit, average input current limit controller 42 generates the reset signal so as not to deliver more current from the IN pin, causing output voltage $V_{OUT}$ to fall.

In the above case, if the sum of power to the load and battery charger causes the input current to exceed the current limit, then power delivery is reduced and output voltage $V_{OUT}$ falls and the battery charger current delivered to the battery automatically falls. Battery charger 22 may be unable to deliver programmed current to the battery ("dropped out battery charger") when output voltage $V_{OUT}$ drops to near the battery voltage $V_{BAT}$. When the voltage across the charger falls below offset voltage VOS in the above case, efficiency of the battery charger 22 will be even higher because there is a smaller potential difference across the battery charger. As the battery charger 22 is unable to deliver current to the battery, current to the external load will automatically be prioritized over the battery charger current due to the resistance of battery charger 22. As an alternative, the battery charger may be replaced with a resistor or a MOS transistor acting as a resistor.

On the other hand, if the load power drawn from the OUT pin precisely matches the power available due to the average input current limit, output voltage $V_{OUT}$ will be precisely equal to battery voltage $V_{BAT}$ and the charge current will fall to zero. In addition, when the load draws current above the input current limit, causing output voltage $V_{OUT}$ to fall below battery voltage $V_{BAT}$, the excess load current may be automatically drawn from the battery via "dropped out" battery charger 22 (see FIG. 3 in more detail). Furthermore, auxiliary diode or ideal diode 60 may also provide power, not provided from power switch 24 or dropped out battery charger 22, to the load from the battery.

In accord with an alternative implementation, switching regulator 11 may be replaced by a linear input current limiting circuit. This implementation will tend to dissipate more input power in the input current limiting circuit as well as the battery charging circuit than the embodiment implementing switching regulator 11. For example, in a USB system, where the total available input power is limited to 2.5 W (5V and 500 mA), the input current limit and battery charger power dissipation can be a substantial fraction of the total available power.

In this implementation, the output voltage will fall to a level just below the level of the battery voltage when the load current exceeds the programmed input current limit. As the output voltage falls, more power is dissipated in the input linear current limit device since power dissipation is equal to the difference in voltage between input voltage $V_{IN}$ and output voltage $V_{OUT}$ times a programmed current limit. This additional power dissipation directly reduces power available to the load.

Thus, assume for a given implementation that the input voltage is 5V, the battery voltage is 3.7V and the programmed input current limit and battery charge current are both set to 500 mA. As the load current is increased from 0 to 500 mA, the battery charge current may fall from 500 mA to 0 mA. The output voltage is assumed to drop from approximately 5V to 4.9V in this example. When the load current is 499.9 mA, the amount of power dissipated is 50 mW while 2.45 W is being delivered to the load. These numbers represent an efficiency of 98%. However, when the load current rises to 500.1 mA, the output voltage drops to just below the level of the battery voltage, e.g., 3.7V. Now, the amount of power dissipated in this example is 650 mW ((5V-3.7 V)×0.5 A) while the power being delivered to the load is just 1.85 W, resulting in an efficiency of 74%. Meanwhile, the battery must be called upon to deliver the extra power (which is being converted to heat inside the IC). The efficiency is less for lower battery voltages and slightly better for higher battery voltage.

On the other hand, the embodiment in FIG. 2 minimizes power dissipation in the charger. Since the output voltage is being generated from a switching regulator, efficiency to the load is maximized. In the case of a 500 mA USB current limited input and a 3.3V battery, approximately 2.25 W is available from the USB input in the embodiment implementing a switching regulator, whereas as little as 1.65 W is available from the above example using the input linear current limit device, once the current limit is exceeded. Moreover, in the FIG. 2 power manager, the voltage across the battery charger is maintained low so that the power dissipation of the battery charger is minimized.

Figure 3:
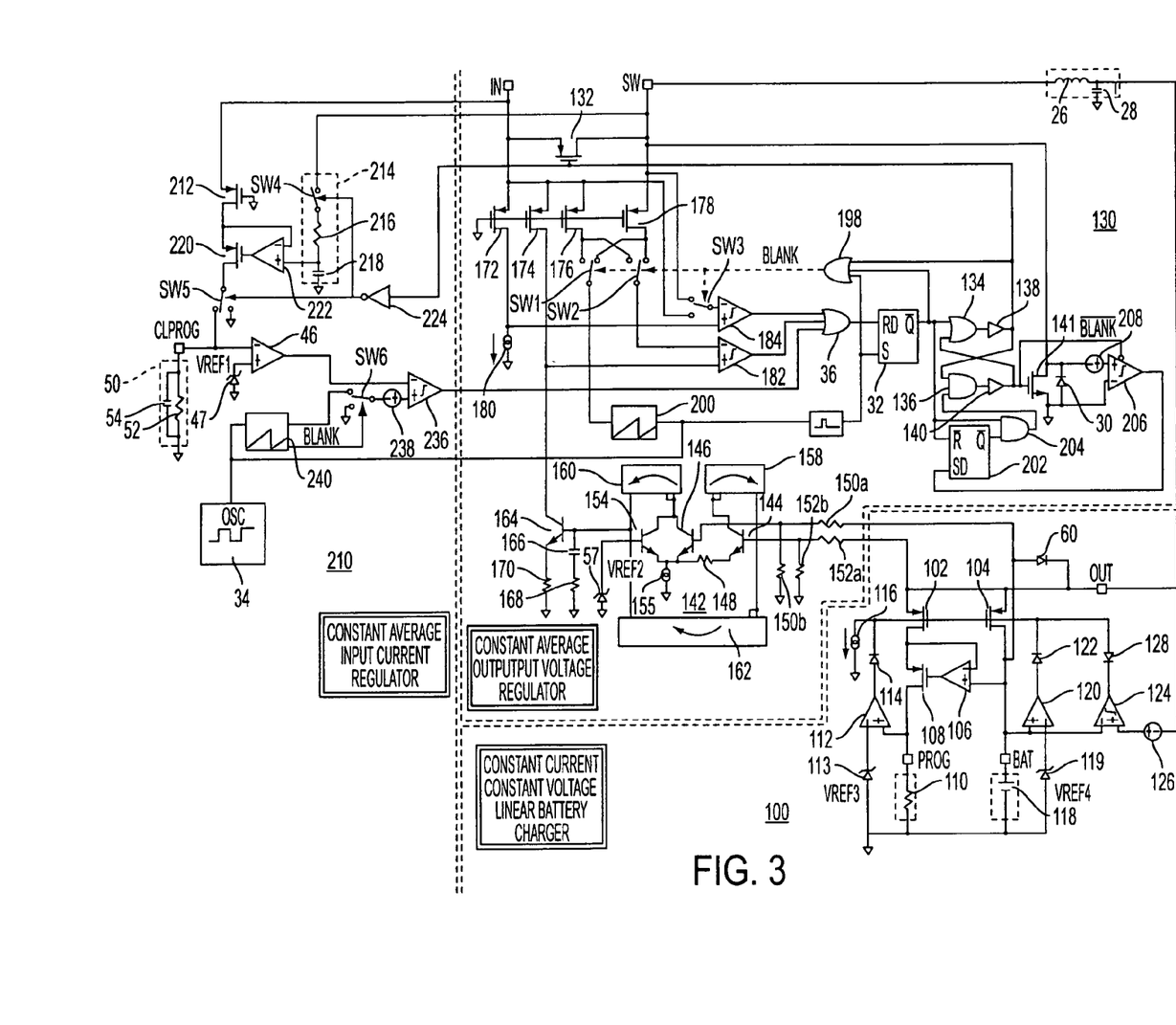
FIG. 3 is an exemplary configuration implementing the power manager shown in FIG. 2.

FIG. 3 is an exemplary configuration implementing the power manager shown in FIG. 2.

Constant current/constant voltage linear battery charger 100 implements the constant current/constant voltage battery charger 22 shown in FIG. 2. Battery charger 100 comprises a low output impedance current source including p-type MOS transistors 102, 104 sized to conduct currents respectively of 1/1000 ratio in this example. The drain of transistor 102 is connected to the inverting input of amplifier 106 and to the source of p-type MOS transistor 108. The drain of transistor 104 is connected to the non-inverting input of amplifier 106 and to the BAT pin. The gate of transistor 108 is controlled by the output of amplifier 106 to ensure that the drain voltages of transistors 102, 104 are equal, thereby minimizing output impedance mismatch errors in those transistors.

The drain of transistor 108 is coupled to a PROG pin to which a programming resistor 110 may externally be connected. Resistor 110 sets charging current in a constant-current mode. The voltage across resistor 110 is applied to the non-inverting input of amplifier 112, and reference voltage $V_{REF3}$ is applied to the inverting input of the amplifier. Reference voltage $V_{REF3}$ is provided by zener diode 113. The output of amplifier 112 drives the gates of transistors 102, 104 through a diode 114 and current source 116, to control battery charging current in the constant-current mode.

A battery 118, e.g., Li-Ion battery (in this embodiment), may externally be coupled to the BAT pin. The battery voltage is applied to the non-inverting input of amplifier 120, and reference voltage $V_{REF4}$ is also applied to the inverting input of the amplifier 120. Reference voltage $V_{REF4}$ is provided by zener diode 119. Amplifier 120 drives the gates of transistors 102, 104 through diode 122 and current source 116 to maintain the battery voltage constant in the constant-voltage mode. The constant-current mode is switched to the constant-voltage mode when battery 118 is nearly charged.

Battery charger 100 may further include comparator 124, the inverting input of which is coupled to the BAT pin and the non-inverting input of which is coupled through a voltage source 126 to the OUT pin. The non-inverting input of the comparator receives output voltage $V_{OUT}$ and offset voltage from voltage source 126. This comparator allows battery charger 100 to perform as an ideal diode when output voltage $V_{OUT}$ falls below battery voltage $V_{BAT}$.

Comparator 124 compares battery voltage $V_{BAT}$ with output voltage $V_{OUT}$ plus the offset voltage. When battery voltage $V_{BAT}$ is greater than output voltage $V_{OUT}$ plus the offset voltage, the output of comparator 124 will be at negative rail voltage and force transistors 102, 104 to turn on, that is, attain their lowest resistance state. With this topology, battery charger 100 quickly provides current to the load through transistor 104, despite a quick drop of output voltage $V_{OUT}$, so as to prevent output voltage $V_{OUT}$ from falling much below battery voltage $V_{BAT}$. Diode 128 may be provided to prevent positive rail output voltage of comparator 124 from affecting the gate voltage of transistors 102, 104.

Diode (or ideal diode circuit) 60 (see FIG. 2) may be implemented by an auxiliary circuit with a separate conduction path in parallel with the battery charger. Diode 60 may provide power, not provided from power switch 24 or battery charger 22, to the load from battery 118.

In FIG. 3, constant average output voltage regulator 130 includes switching regulator 11 and average output voltage limit control loop 17, shown in FIG. 2. A p-type MOS power switch transistor 132, coupled between the IN pin and the SW pin, corresponds to power switch 24 in FIG. 2. Power switch transistor 132 is controlled by set and reset signals from RS flop-flop 32 through the non-overlap and drive logic. An AND gate 136, an OR gate 134 and two buffers 138, 140 constitute non-overlap and drive logic 40 in FIG. 2. The output of buffer 140 is connected to the gate of an n-type MOS transistor 141 corresponding to synchronous switch 38 in FIG. 2. The non-overlap and drive logic ensures that power switch transistor 132 turns off before synchronous transistor 141 turns on, or vise versa, to avoid cross conduction.

RS flip-flop 32 has an RD (reset-dominant) input in this embodiment. Accordingly, when there is a conflict, i.e., both reset and set signals are logically high, RS flip-flop 32 is configured to always choose the reset signal. Therefore, the reset signal from OR gate 36 always controls the switching of power switch transistor 132. Of course, RS flip-flop 32 may alternatively be configured to be set dominant.

Constant average output voltage regulator 130 includes four p-type MOS transistors 172, 174, 176, 178, whose gates are grounded. These transistors comprise a scaled-down version of power switch transistor 132. The sources of transistors 172, 174, 176 are coupled to the IN pin and the source of power switch transistor 132. The drain of transistor 172 is coupled to current source 180 representing an absolute peak current limit of the inductor current. Transistor 172 acts like a resistor matching the resistance of power switch transistor 132. Transistor 178 conveys information about the current through power switch transistor 132. Further, the drain of transistor 178 may be selected by switches SW1, SW2 when power switch transistor 132 is turned on, while the drain of transistor 176 may be selected by switches SW1, SW2 when power switch transistor 132 is turned off (discussed below).

A three-input amplifier 142 corresponds to amplifier 56 in FIG. 2. Amplifier 142 has two inputs, one of which is from the OUT pin and another from the BAT pin. These two inputs are connected to the bases of transistors 144, 146, respectively, which constitute a differential pair. A resistor 148 between the emitters of transistors 144, 146 creates offset voltage VOS, shown in FIG. 2. When amplifier 142 is balanced, voltages on the bases may differ by the amount of the voltage across resistor 148. Resistors 150a, 150b and resistors 152a, 152b are voltage dividers, which respectively divide the voltages at the OUT and BAT pins. Amplifier 142 further includes a transistor 154, whose base is connected to zener diode 57 (see FIG. 2) to provide reference voltage $V_{REF2}$ to amplifier 142. If battery voltage $V_{BAT}$ drops below the level defined by reference voltage $V_{REF2}$, output voltage $V_{OUT}$ begins tracking reference voltage $V_{REF2}$. In amplifier 142, the three blocks 158, 160, 162 indicate current mirrors, the detailed circuit diagrams of which are omitted for brevity. Arrows in blocks 160 and 162 indicate directions of current flow to the output of amplifier 142. Inputs to the current mirrors, i.e., blocks 158, 160, and 162 are reference inputs, and the arrows point to output current, respectively. Reference 155 indicates a current source.

The output voltage of amplifier 142 may be connected to the base of output transistor 164, through a compensation RC network including capacitor 166 and resistor 168. The output of amplifier 142 is filtered by the RC network so that output voltage $V_{OUT}$ can be regulated according to the average output voltage $V_{OUT}$. The RC network can be provided externally to power manager 10. The emitter of output transistor 164 is coupled to ground through resistor 170 and the collector of the transistor is coupled to the drain of transistor 174.

When the output of amplifier 142 is large enough to turn on transistor 164, current flows through transistor 174, and a reference voltage based on that current is applied to the non-inverting input of PWM comparator 182. Current from the drain of power switch transistor 132 through transistor 178 and switch SW2 provides a voltage to the inverting input of PWM comparator 182. PWM comparator 182 compares those voltages, and generates the reset signal when the difference between these voltages goes positive. The reset signal is applied to one input of OR gate 36.

Constant average output voltage regulator 130 further includes slope compensation ramp generator 200. For normal operation at duty cycles of fifty percent or higher, compensation may be needed in the switching control to avoid subharmonic oscillation. A typical approach is termed "slope compensation," wherein a signal of increasing magnitude is added to the measure of current flowing through power switch transistor 132 thereby making its current appear to be increasing faster than it actually is during each switching cycle. In FIG. 3, a ramp signal generated by generator 200 from an oscillator pulse may be applied through switch SW1 to the drain node of transistor 178 where scaled-down current flowing through power switch transistor 132 can be slope-compensated. PWM comparator 182 compares a voltage according to the slope-compensated current with the reference voltage produced by current pulled through transistor 174.

Constant average output voltage regulator 130 includes ILIM comparator 184, not shown in FIG. 2. ILIM comparator 184 limits peak inductor current to within a current limit defined by current source 180. Current source 180 may represent an absolute peak current limit of the inductor current. The non-inverting input of ILIM comparator 184 is coupled to the drain of transistor 172 and current source 180 so that the non-inverting input of ILIM comparator 184 receives a reference voltage. The inverting input of the comparator is coupled to the drain of power switch transistor 132 through a switch SW3 to receive the voltage, reduced in magnitude across power switch transistor 132. This voltage represents how much current is flowing through transistor 132. ILIM comparator 184 compares these voltages, and generates the reset signal when the difference between the voltages is positive. The reset signal is provided to OR gate 36.

Constant average output voltage regulator 130 further includes blanking circuitry to steer the comparators away from their input signals in a blanking period, i.e., when power switch transistor 132 remains turned off. This ensures proper operation of comparators 182, 184 (and comparator 236, discussed below) because power switch transistor 132 is not at a proper voltage when the transistor is turned off. Switches SW1, SW2, SW3 are operated so as not to connect comparators 182, 184 to the drain of power switch transistor 132.

When the set signal is logically high, and signals turning off power switch transistor 132 from RS flop-flop 32 and buffer 138 of the non-overlap and drive logic are logically high, OR gate 198 drives a blanking signal (see dotted lines) high. Then, switch SW1 interconnects the drain of transistor 176 and slope compensation ramp generator 200. Switch SW2 also interconnects the drain of transistor 176 and the inverting input of PWM comparator 182. Switch SW3 interconnects the inverting input of ILIM comparator 184 and the IN pin.

If the current through inductor 26, which is ramping down, does not start from a high level, the current can ramp down to a point where it starts reversing and flows back through inductor 26 into the SW pin. A feature of the disclosed circuitry controls n-type MOS transistor 141, corresponding synchronous switch 38 in FIG. 2, so as not to allow the inductor current to reverse by maintaining the current to stay at zero when it goes to zero. As described above, transistor 141 (synchronous switch 38 in FIG. 2) is provided for efficiency, in addition to diode 30.

The circuitry for this purpose includes RS flip-flop 202, AND gate 204, comparator 206, and voltage source 208. Specifically, comparator 206 monitors a voltage between the drain and the source of transistor 141, and in response, detects whether the inductor current is reversed. When reversed inductor current is detected, comparator 206 turns off transistor 141 through RS flip-flop 202 and AND gate 204. Accordingly, transistor 141 is controlled to act like a diode.

Constant average input current regulator 210 in FIG. 3 corresponds to average input current limit control loop 15 in FIG. 2 including current sensing circuit 48. Regulator 210 limits the average input current to meet a certain limit such as the USB specification.

Regulator 210 includes p-type MOS transistor 212 whose gate is grounded. Transistor 212 is of a size that is a given fraction of the size of power switch transistor 132. Current in transistor 212 is a scaled down replica of current flowing in power switch transistor 132. The drain of transistor 212 is coupled to the source of a p-type MOS transistor 220 and the inverting input of an amplifier 222.

A resistor-capacitor-switch network 214 is connected between the SW pin and the non-inverting input of amplifier 222. Generally, a resistor 216 and capacitor 218 of network 214 may generate an averaged representation of the voltage at the SW pin ("switch pin voltage"). Switch SW4 is turned on by the output of an inverter 224 when power switch transistor 132 is turned on. SW4 ensures that only the voltage during the "switch on" phase of the regulation cycle is provided to resistor-capacitor network 216, 218. Therefore the voltage on capacitor 218 is an average of the SW pin voltage sampled only when transistor 132 is on.

Amplifier 222 monitors the filtered switch pin voltage (i.e., the averaged switch pin voltage). That voltage has much lower frequencies than those of the switch pin voltage. Amplifier 222 servos the gate of transistor 220 such that the source voltage of transistor 220 becomes equal to the averaged switch pin voltage.

The scaled down replica current from transistor 220 is provided to a CLPROG pin through a switch SW5. Switch SW5 couples the drain of transistor 220 to the CLPROG pin to measure the scaled down replica current when power switch transistor 132 is turned on. Switch SW5 couples the drain of transistor 220 to ground when transistor 132 is turned off. Since its feedback loop is left intact whether switch 132 is on or off, amplifier 222 is virtually oblivious to the action of switch SW5. Thus, the current in transistor 220, and therefore the output voltage of amplifier 222, remain approximately constant during the off phase of transistor 132. SW5 may alternatively couple the drain of transistor 220 to a voltage source or load wherein the voltage is approximately equal to reference voltage $V_{REF1}$ (see FIG. 2). In another embodiment SW5 may be coupled to the output of a servo amplifier which produces a voltage equivalent to the voltage at the CLPROG pin.

The CLPROG pin is connected to RC network 50, including an averaging capacitor 54 and resistor 52, shown in FIG. 2. RC network 50 can externally be provided to the CLPROG pin in this example. When switch SW5 is turned on, the scaled down replica current is applied to RC network 50, where capacitor 54 and resistor 52 average the current, and obtain a voltage based on the averaged scaled replica current. The voltage is applied to the inverting input of error amplifier 46 (see FIG. 2), whose non-inverting input is coupled to zener diode 47 (see FIG. 2) to provide reference voltage $V_{REF1}$ to the non-inverting input.

Error amplifier 46 compares the voltage at the CLPROG pin with reference voltage $V_{REF1}$. According to the difference between those voltages, error amplifier 46 provides an error signal to the inverting input of a PWM comparator 236.

The non-inverting input of PWM comparator 236 is coupled to PWM ramp generator 240 through voltage source 238 and switch SW6. Switch SW6 couples PWM comparator 236 to PWM ramp generator 240 when power switch transistor 132 is turned on. When power switch transistor 132 is turned off, switch SW6 couples PWM comparator 236 to ground according to a blank signal in order to prevent the comparator from outputting an inaccurate signal. This is so because there is no scaled down current from transistor 212 to be measured by RC network 50 when power switch transistor 132 is turned off. PWM comparator 236 may generate the reset signal in a cycle by cycle manner according to a ramp signal from PWM ramp generator 240. The reset signal is provided to OR gate 36.

PWM ramp generator 240 is configured to generate the ramp signal based on an oscillator pulse. Implementation of the generator is disclosed, for example, in U.S. Pat. No. 6,404,251 to Dwelley et al., which is hereby incorporated by reference.

OR gate 36 outputs the reset signal to RS flip-flop 32 whenever it receives a signal from any one of comparators 182, 184 and 236.

In FIG. 3, the replica current of current flowing in power switch transistor 132 is generated for measurement. It will appreciated by persons skilled in the art that a resistor placed in circuit path 12 can be used to measure the average current flowing in power switch transistor 132.

Figure 4:
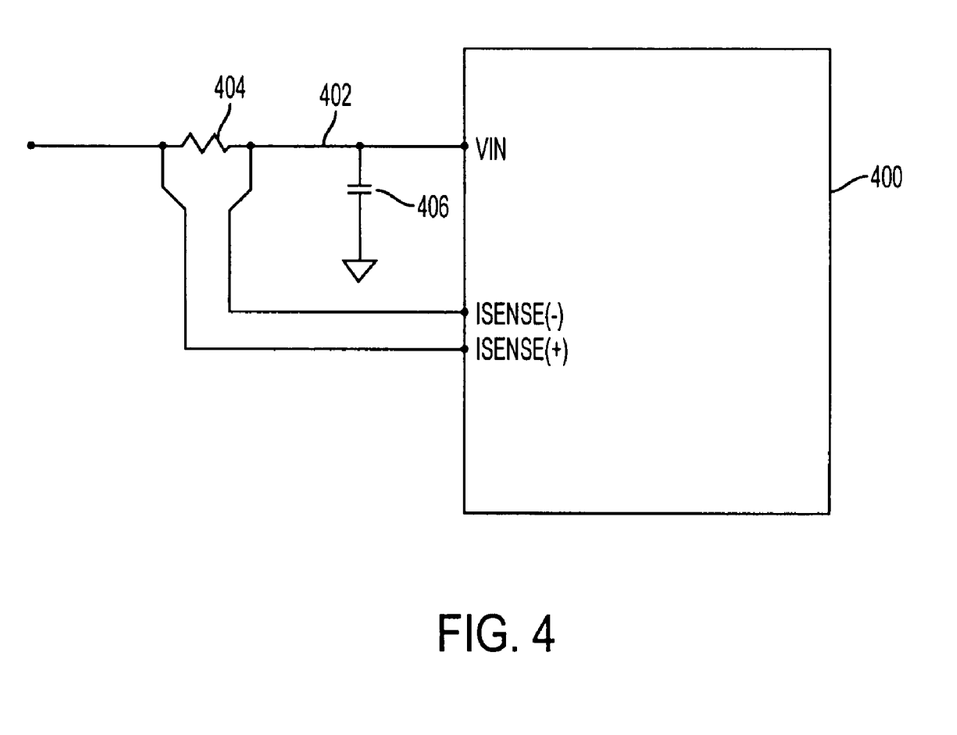
FIG. 4 is an exemplary alternative embodiment for measurement of average input current.

FIG. 4 is an exemplary alternative embodiment for measurement of the average input current. A chip 400 includes power manager 10 of this embodiment having the $V_{IN}$ pin to which a path 402 to provide power to the $V_{IN}$ pin is connected. In the path, a sense resistor 404 and an input bypass capacitor 406 may be provided. Chip 400, i.e., power manager 10, may further include ISENSE(−) and ISENSE(+) pins to measure average input current by measuring the voltage across sense resistor 404. The exemplary circuitry shown in FIG. 4 can replace RC network 50 as well as circuit elements SW4, SW5, 212, 220, 222, 218, 216, 224, 214 shown in FIGS. 2 and 3. Other variations are possible.

Having described embodiments, it is noted that modifications and variations can be made by person skilled in the art in light of the above teachings. It is therefore to be understood that changes may be made in the particular embodiments disclosed that are within the scope and sprit of the disclosure as defined by the appended claims and equivalents.

What is claimed is:

1. A power manager for managing power for a battery-powered application, comprising:
    a circuit path for interconnecting a power source, a load, and a battery;
    a controller, provided between (a) the power source and (b) the load and the battery, configured for controlling power delivery through the circuit path to the load and battery, the load and the battery sharing the power supplied from the controller,
    a first circuit configured for coupling a battery to the circuit path to charge the battery;
    a second circuit configured for monitoring a voltage in the circuit path to detect whether the voltage exceeds both (1) a battery voltage plus a first reference and (2) a second reference; and
    a third circuit configured for monitoring input current in the circuit path to detect whether the input current exceeds a current limit,
    wherein the controller is coupled to the second and third circuits, and configured to limit the power delivery in response to a voltage or current detection by the second and third circuits, respectively.

2. The power manger according to claim 1, wherein the controller comprises:
    a switching regulator for delivering power to the load and battery according to a switching pulse; and
    a switching controller configured for terminating the switching pulse during a regulator switching cycle to establish, a regulator duty cycle based upon a detection by the second or third circuit.

3. The power manager according to claim 2, wherein
    the second circuit is configured to determine an average voltage in the circuit path so as to compare the average voltage with both (1) the battery voltage plus the first reference and (2) the second reference, and
    the third circuit is configured to determine an average input current in the circuit path so as to compare the average input current with the current limit.

4. The power manager according to claim 1, wherein when the third circuit detects that the input current exceeds the current limit, the controller limits the input current in the circuit path, causing a voltage in the circuit path to drop, and when the voltage in the circuit path drops to near a battery voltage, the first circuit is unable to deliver a programmed charge current to the battery and the load is prioritized to receive the current.

5. The power manager according to claim 4, wherein the first circuit is configured to provide current from the battery to the load when the voltage in the circuit path drops below the battery voltage.

6. The power manager according to claim 5, wherein the first circuit is configured to selectively operate as an ideal diode to provide the current from the battery to the load or operate as a battery charger.

7. The power manager according to claim 5, wherein the first circuit includes an ideal diode to provide the current from the battery to the load.

8. The power manager according to claim 1, wherein the first circuit is a constant-current/constant-voltage battery charger.

9. The power manager according to claim 1, wherein the first reference voltage varies depending on a program current.

10. A power managing method for a battery-powered application, comprising the steps of:

interconnecting a power source and a load through a circuit path to provide power from the power source to the load;

coupling a battery to the circuit path through a circuit configured for charging the battery;

controlling power delivery through the circuit path to the load and battery, the load and the battery sharing power delivered;

monitoring a voltage in the circuit path to detect whether the voltage exceeds both (a) a battery voltage plus a first reference voltage and (b) a second reference voltage; and monitoring input current in the circuit path to detect whether the input current exceeds a current limit, wherein the power delivery controlling step includes monitoring the voltage monitoring step and the input current monitoring step, and limiting the power delivery in response to a voltage or current detection by the voltage monitoring and input current monitoring steps, respectively.

11. The power managing method according to claim 10, wherein the circuit is a constant-current/constant-voltage battery charger.

* * * * *